United States Patent [19]
Kisuki

[11] Patent Number: 5,623,630
[45] Date of Patent: Apr. 22, 1997

[54] DATA PROCESSOR WITH APPLICATION PROGRAM BUFFER TO CACHE BUFFER COPY CAPABILITY TO PREVENT MISMATCHES

[75] Inventor: Yasuhisa Kisuki, Itami, Japan

[73] Assignee: Mitsubishi Denki Kabushiki Kaisha, Tokyo, Japan

[21] Appl. No.: 353,249

[22] Filed: Dec. 2, 1994

[30] Foreign Application Priority Data

Dec. 6, 1993 [JP] Japan .................................. 5-305294

[51] Int. Cl.⁶ ..................................................... G06F 12/16
[52] U.S. Cl. .......................... 395/468; 395/440; 395/445; 395/465
[58] Field of Search ..................................... 395/465, 468, 395/470, 440, 250, 466, 445

[56] References Cited

U.S. PATENT DOCUMENTS 4,075,686  2/1978  Calle et al. ............................. 395/465
5,293,618  3/1994  Tandai et al. .......................... 395/650

FOREIGN PATENT DOCUMENTS 3-196345  8/1991  Japan .
4-60730   2/1992  Japan .

OTHER PUBLICATIONS

"Minix Operating System", A. S. Tanenbaum, Trans. Teryuo Onishi, pp. 364–377, Apr. 21, 1989, by Aski Inc.
Jim Handy, "The Cache Memory Book", 1993, Academic Press, pp. 64–84.

Primary Examiner—Eddie P. Chan
Assistant Examiner—Hong Kim
Attorney, Agent, or Firm—Lowe, Price, LeBlanc & Becker

[57] ABSTRACT

A data processor is configured so that a mismatching does not occur between inputted or outputted data and data stored in a cache buffer region even when data is inputted or outputted by an application program to/from a block type device by bypassing the cache buffer region. A mismatched state eliminating unit is provided for copying data between the buffer for the application program to eliminate the mismatching when the mismatching results between the actually inputted or outputted data and the data stored in the cache buffer region. A selection condition holding unit is provided for holding a selection condition which determines whether or not to bypass the cache buffer region. An arbitrary value can be set in the selection condition holding unit by the application program. The block type device may comprise a flexible disk unit, a hard disk unit, or an optomagnetic disk unit.

5 Claims, 6 Drawing Sheets

DATA PROCESSOR WITH APPLICATION PROGRAM BUFFER TO CACHE BUFFER COPY CAPABILITY TO PREVENT MISMATCHES

BACKGROUND OF THE INVENTION

1. Field of the Invention

The present invention relates to a data processor having a cache buffer, wherein, utilizing the cache buffer, an application program can input/output data to/from a memory device. The data is a series of data which is inputted/outputted as a block; e.g. a sector on a recording medium where the recording medium can be a flexible disk unit, a hard disk unit, an optomagnetic disk unit, or the like.

2. Description of the Related Art

Figure 1:
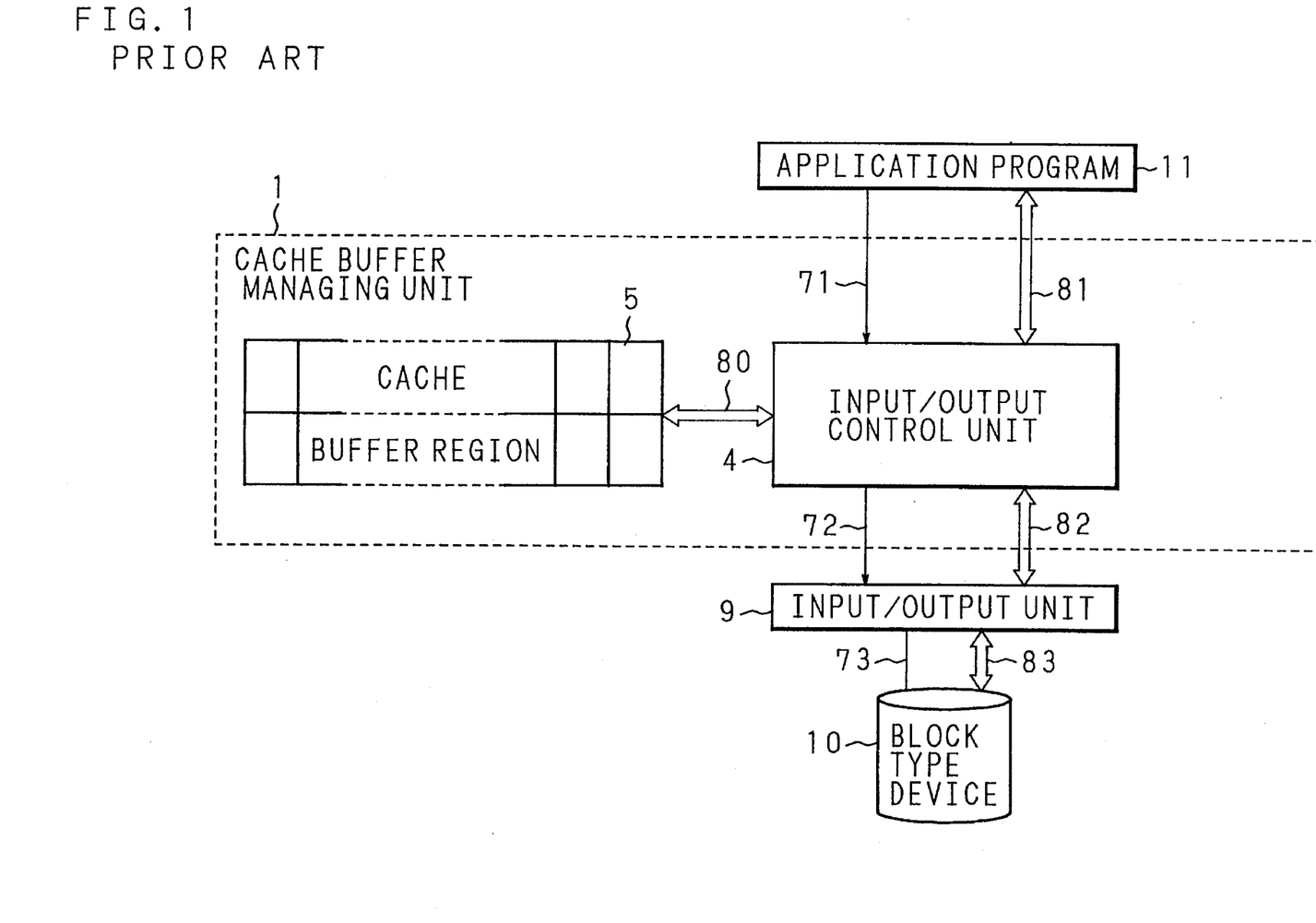
FIG. 1 is a block diagram showing functions of hardware and software for cache buffer management of a conventional data processor having a cache buffer.

FIG. 1 is a block diagram showing functions of hardware and software for managing the cache buffer in a conventional data processor having a cache buffer. In FIG. 1, reference numeral 10 denotes a block type device such as a hard disk unit mentioned above, 9 is an input/output unit for controlling input/output processing of data to/from the block type device 10, 1 is a cache buffer managing unit composed of a cache buffer 5 and an input/output control unit 4, and 11 is an application program which uses the block type device 10 as a memory device.

The cache buffer managing unit 1 comprises the cache buffer 5 and the input/output control unit 4 as a software. The cache buffer 5, specifically, is provided in a block unit in a memory built in a microcomputer, in order to hold the data corresponding to the block which is a storing unit of data on a recording medium of the block type device 10. The input/output control unit 4 controls the input and output processing of the data through the cache buffer 5 by using the input/output unit 9.

In FIG. 1, arrows of reference numerals in the seventies denote the control signal lines, and arrows in the eighties represent the data transfer routes.

In such prior art, processing flow when an input or output is requested from the application program 11 to the cache buffer managing unit 1 is explained below.

At first, the input processing is described.

When the application program 11 needs to input data from the block type device 10, a data input request is issued and sent to the input/output control unit 4 through the signal line 71. For example, when the application program 11 issues an input request of data for n blocks from block number m of the block type device 10, the input/output control unit 4 at first checks whether there are blocks of the cache buffer 5 corresponding to the requested blocks on the block type device 10 or not. When the corresponding blocks of the cache buffer 5 are present, the input/output control unit 4 transfers the data stored in the cache buffer 5 to the application program 11 of the requesting side through the route of arrows 80 and 81, so that input processing is terminated without using the input/output unit 9.

On the other hand, when there is no block of the cache buffer 5 corresponding to the blocks of the block type device 10 to which an input request is issued from the application program 11, the input/output control unit 4 at first allocates the necessary blocks of the cache buffer 5 to the memory, and then gives the input request to the input/output unit 9 through the signal line 72. In consequence, the input/output unit 9 reads out the data of the blocks to which input request has been issued by giving the input request to the block type device 10 through the signal line 73, from the block type device 10, and stores the data through the routes 83, 82 and 80 into the blocks newly allocated to the cache buffer 5. Thereafter, the data is transferred from the cache buffer 5 into the application program 11 of the requesting side through the routes 80 and 81, thereby terminating the input processing.

When the application program 11 needs to output the data to the block type device 10, a data output request is issued, and is given to the input/output control unit 4 through the signal line 71. For example, when an output request is issued from the application program 11 to the data for n blocks from block number m of the block type device 10, the input/output control unit 4 at first checks whether there are blocks of the cache buffer 5 corresponding to the requested blocks on the block type device 10 or not. When the corresponding block of the cache buffer 5 is present, the input/output control unit 4 transfers the data from the application program 11 at the requesting side to the cache buffer 5 through the routes 81 and 80, so that the output processing is terminated without using the input/output unit 9.

On the other hand, when there is no block of the cache buffer 5 corresponding to the blocks of the block type device 10 to which output request is issued from the application program 11, the input/output control unit 4 at first allocates the necessary blocks of the cache buffer 5 to the memory, and then transfers the data from the application program 11 at the requesting side to the cache buffer 5 through the routes 81 and 80, thereby terminating the output processing.

In the above output processing, the blocks which are necessary in the block type device 10 when output request is issued from the application program 11 is supposed to be newly allocated. Therefore, the processing of reading data from the input/output unit 9 into the block type device 10 of the output destination after the cache buffer 5 is allocated is omitted.

In the data processor having the conventional cache buffer, all input and output processings relating to the block type device has been conducted through the cache buffer as mentioned above. Therefore, when the number of blocks requested from the application program is large, the number of blocks allocated to the cache buffer is also large, and hence exchange of cache buffers occurs very frequently. Such situation may cause to lower the hit rate of the cache buffer, and the effect of the cache buffer installed for the purpose of enhancing the performance of the microcomputer is not exhibited fully. Moreover when the number of blocks exceeding the number of prepared cache buffers is requested, the input or output request to the block type device is divided plural times, and hence it takes a very long time.

In this background, for example, inventions are proposed and disclosed in the Japanese Patent Application Laid-Open No. 4-60730 (1992) and Japanese Patent Application Laid-Open Ko Kai No. 3-196345 (1991). The former discloses the constitution for bypassing the cache buffer in case of input or output of data exceeding the capacity of the cache buffer. The latter discloses the constitution for performing input or output of data only after judging whether the cache buffer is used or not.

In either invention, however, in case of input or output of data by bypassing the cache buffer, an unmatched state may occur, that is, the inputted or outputted data does not coincide with the data stored in the cache buffer.

SUMMARY OF THE INVENTION

The invention is devised in the light of such circumstances, and it is hence a primary object thereof to provide a data processor having a cache buffer which is constituted so as not to cause mismatching between the inputted or outputted data and the data stored in the cache buffer.

To achieve the object, the data processor having a cache buffer of the invention comprises mismatched state eliminating means for judging whether there is mismatching or not between the actual input or output data and the data stored in the cache buffer when the cache buffer is bypassed in case of data inputted or outputted by the application program to/from the memory device as a block type device, and for copying the data, when mismatching occurs, between a buffer for the application program and the cache buffer so as to eliminate the mismatch.

The data processor having a cache buffer of the invention also comprises selection condition holding means for holding the selection condition of whether or not to bypass the cache buffer in case of data inputted or outputted, so that the selection condition to be held therein may be optionally set by processing of the application program.

According to the data processor having the cache buffer of the invention, when the cache buffer is bypassed at inputting/outputting data by the application program to/from the memory device as a block type device, it is judged whether there is mismatching or not between the actual inputted or outputted data and the data stored in the cache buffer, and when mismatching has occurred, in order to eliminate the mismatch, data is copied by mismatching state eliminating means between the buffer for application program and the cache buffer, thereby eliminating the mismatched state.

Moreover, in the data processor having the cache buffer of the invention, the selection condition whether or not to bypass the cache buffer in inputting or outputting of data can be optionally set depending on the necessity of the application program.

The above and further objects and features of the invention will more fully be apparent from the following detailed description with accompanying drawings.

DESCRIPTION OF THE PREFERRED EMBODIMENTS

Figure 2:
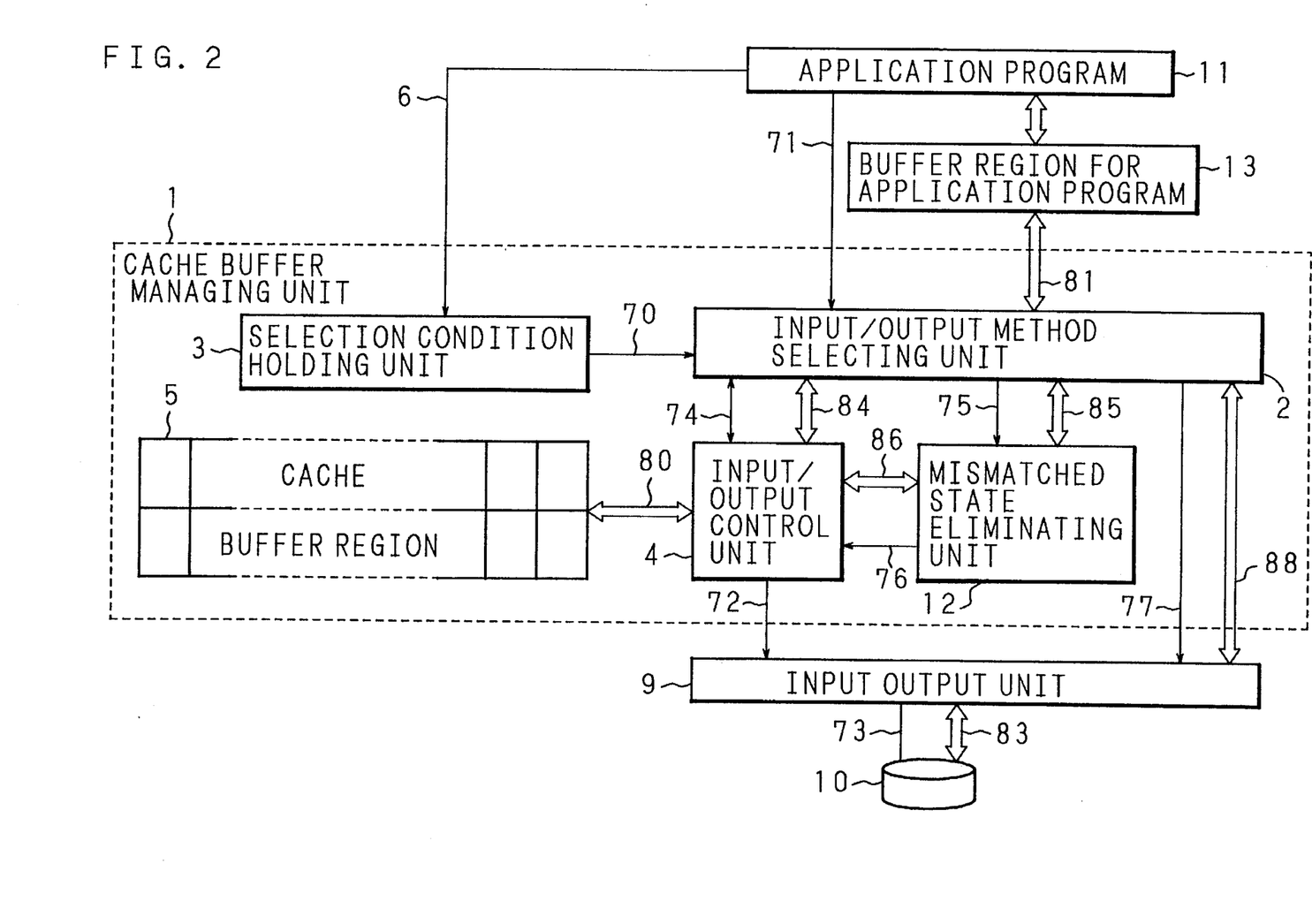
FIG. 2 is a block diagram showing functions of hardware and software for cache buffer management of a data processor having a cache buffer of the invention.

The invention is described below while referring to drawings showing its embodiments. FIG. 2 is a block diagram showing functions of hardware and software for cache buffer management of the data processor having a cache buffer in the invention.

In FIG. 2, reference numeral 10 denotes a block type device as a memory device, and 9 is an input/output unit for controlling input and output processing of data to/from the block type device 10. The block type device 10 is a memory device, such as a hard disk unit, and is connected to a microcomputer system which is a data processor, through the input/output unit 9 as an interface.

Reference numeral 1 denotes a cache buffer managing unit, which is mainly composed of an input/output method selecting unit 2, a selection condition holding unit 3, an input/output control unit 4, a cache buffer region 5 and a mismatched state eliminating unit 12. The cache buffer managing unit 1 is composed of hardware and software incorporated in the microcomputer system.

Reference numeral 11 denotes an application program which is executed by the microcomputer system with use of the block type device 10 as a memory device, and 13 denotes a buffer region for the application program provided on the memory built in the microcomputer system.

The cache buffer managing unit 1 is composed of the cache buffer region 5, the selection condition holding unit 3 as a memory or a register, and the input/output method selecting unit 2, the input/output control unit 4 and the mismatched state eliminating unit 12 as a software.

The cache buffer region 5, specifically, is provided in a block unit on the memory built in the microcomputer, in order to hold the data corresponding to blocks which are the storing units of data on the memory medium of the block type device 10. The input/output control unit 4 copies data having been inputted/outputted by the input/output unit 9 between the buffer region 13 for the application program and the cache buffer region 5.

The input/output control unit 4 has a function for copying data in block unit between the buffer region 13 for the application program and the cache buffer region 5, and a function for judging whether all blocks corresponding to the blocks to which processing request has been issued from the application program 11 are present or not in the cache buffer region 5.

The input/output method selecting unit 2 has a function for inquiring to the input/output control unit 4 whether all blocks requested by the application program 11 are present or not on the cache buffer region 5 by receiving input or output request from the application program 11, and a function for selecting whether or not to allocate new blocks to the cache buffer region 5 when not present.

The mismatched state eliminating unit 12 has a function for eliminating a mismatched state when it has occurred, by detecting the mismatched state which may possibly occur at the time of input or output processing of data done by the input/output unit 9 in the case where all blocks requested by the input/output control unit 4 are judged not to be present in the cache buffer region 5.

The selection condition holding unit 3 has a function of holding a selection condition as the basis for judging whether or not to allocate the cache buffer by the input/output method selecting unit 2, more specifically holding the number of blocks that can be newly allocated to the cache buffer region 5.

In FIG. 2, arrows of reference numerals in the seventies denote control signal lines, and arrows of the eighties denote data transfer routes.

Figure 3:
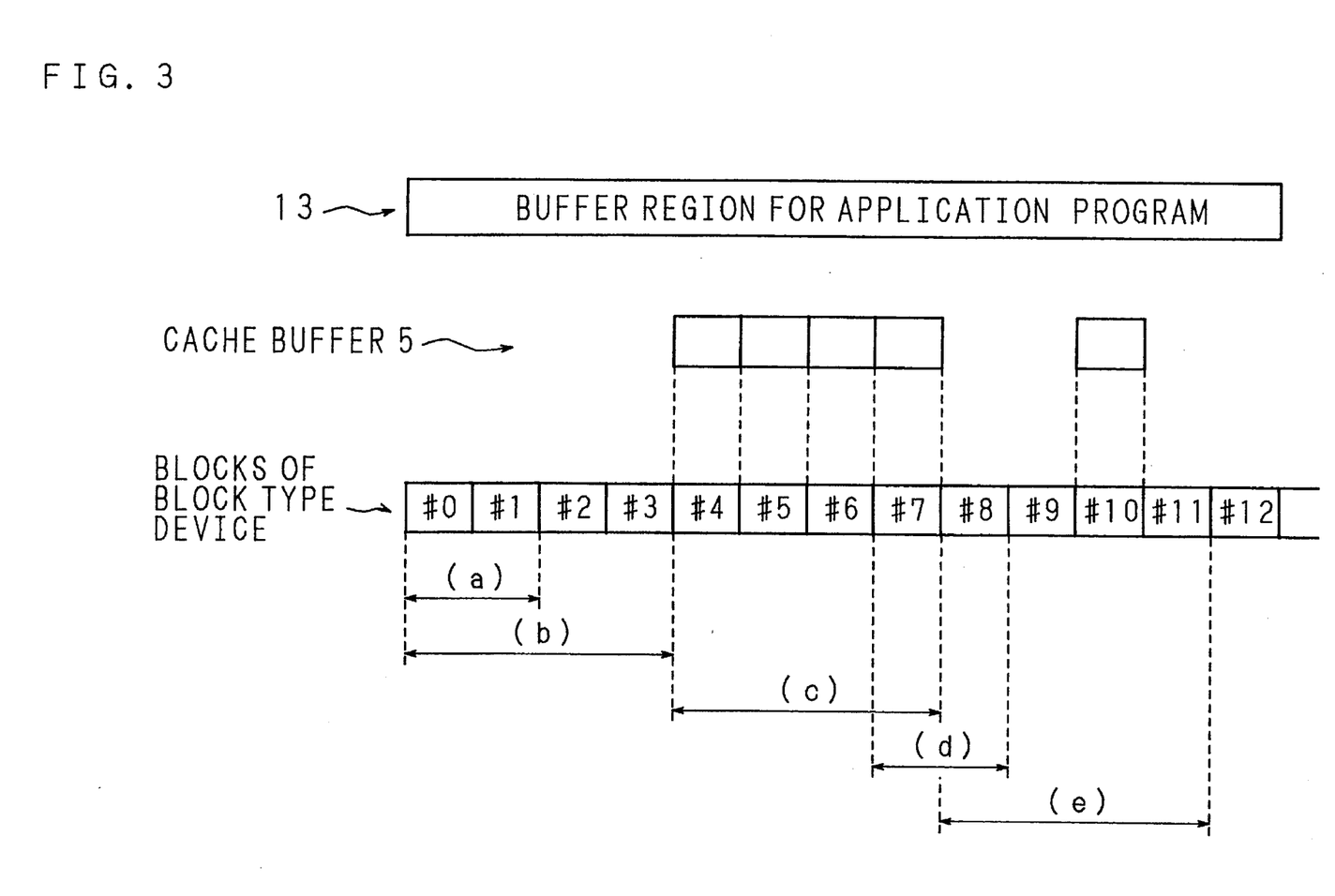
FIG. 3 is a schematic diagram showing a buffer region used by an application program, using state of blocks of cache buffer region, and blocks of a block type device in managing of a cache buffer of a data processor having a cache buffer of the invention.

FIG. 3 is a schematic diagram showing the buffer region 13 used by the application program 11, using state of the blocks in the cache buffer region 5, and the blocks of the block type device 10. More specifically, it shows the state in which the contents of block numbers #4, #5, #6, #7 and #10 of the block type device 10 in the buffer region 13 used by the application program are held in the cache buffer region 5.

Next, explanation will be made on the operation for the management of the cache buffer of the data processor of the invention. At first, the flow of processing when input or output request has been issued from the application program 11 to the cache buffer managing unit 1 is disclosed.

When the application program 11 needs to read out data from the block type device 10, an input request of data is issued, while an output request of data is issued when the application program 11 needs to write data into the block type device 10. As the input and output processing patterns of data, the following five types are considered.

(a) A case where input or output processing for allocating the cache buffer region 5 by the input/output method selecting unit 2 is executed, and all blocks to be processed are not present in the cache buffer region 5 before start of processing. In this case, processing by the mismatched state eliminating unit 12 is not needed.

(b) A case where input or output processing for not allocating the cache buffer region 5 by the input/output method selecting unit 2 is executed, and all blocks to be processed are not present in the cache buffer region 5 before start of processing. In this case, processing by the mismatched state eliminating unit 12 is not needed.

(c) A case where all blocks to be processed are present on the cache buffer region 5. In this case, processing by the mismatched state eliminating unit 12 is not needed.

(d) A case where input or output processing for allocating the cache buffer region 5 by the input/output method selecting unit 2 is executed, and only a part of the blocks to be processed is present on the cache buffer region 5 before start of processing. In this case, processing by the mismatched state eliminating unit 12 is needed.

(e) A case where input or output processing for not allocating the cache buffer region 5 by the input/output method selecting unit 2 is executed, and a part of the blocks to be processed is present on the cache buffer region 5 before start of processing. In this case, processing by the mismatched state eliminating unit 12 is needed.

As the selection condition, in this embodiment, the maximum number of blocks to be processed which is allocated to the cache buffer region 5 is two blocks, and it is supposed to be set in the selection condition holding unit 3 from the application program 11 through the signal line 6. Incidentally, when the maximum number of blocks to be processed is two blocks, (a) to (e) in FIG. 3 correspond to the conditions (a) to (e) above mentioned.

Figure 4:
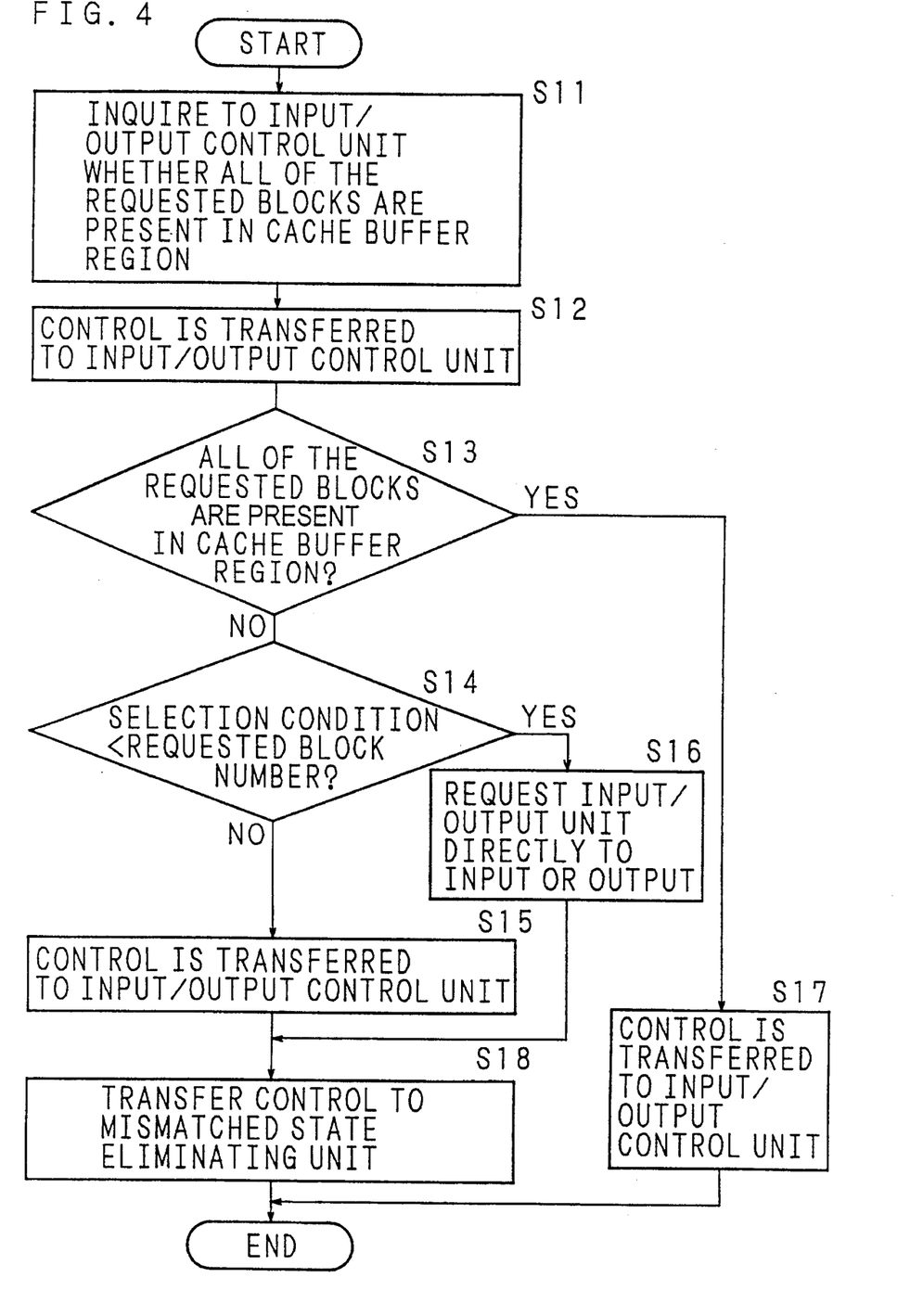
FIG. 4 is a flow chart showing an operating procedure of an input/output method selecting unit in managing of a cache buffer of a data processor having a cache buffer of the invention.
Figure 5:
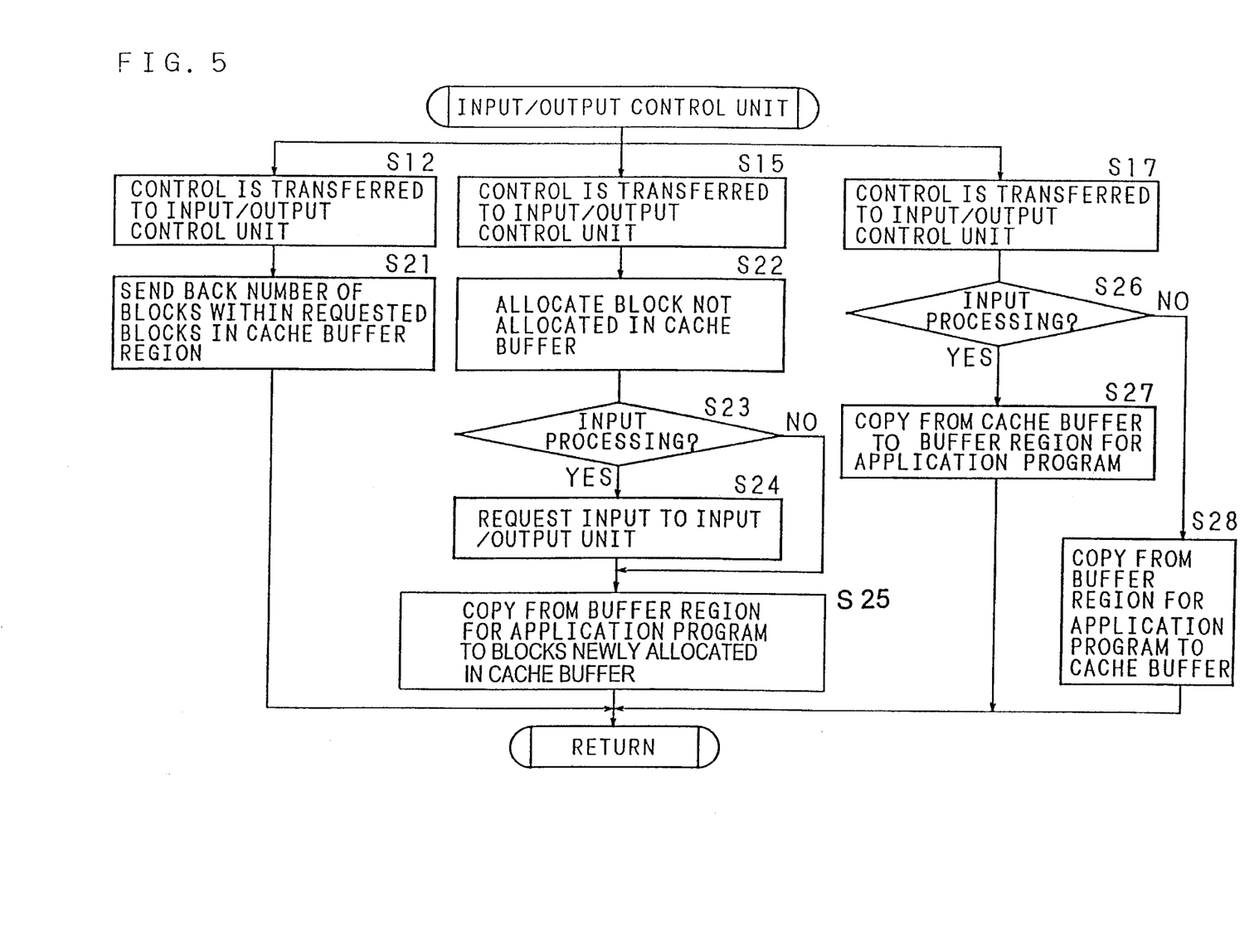
FIG. 5 is a flow chart showing an operating procedure of an input/output control unit in managing of a cache buffer of a data processor having a cache buffer of the invention.
Figure 6:
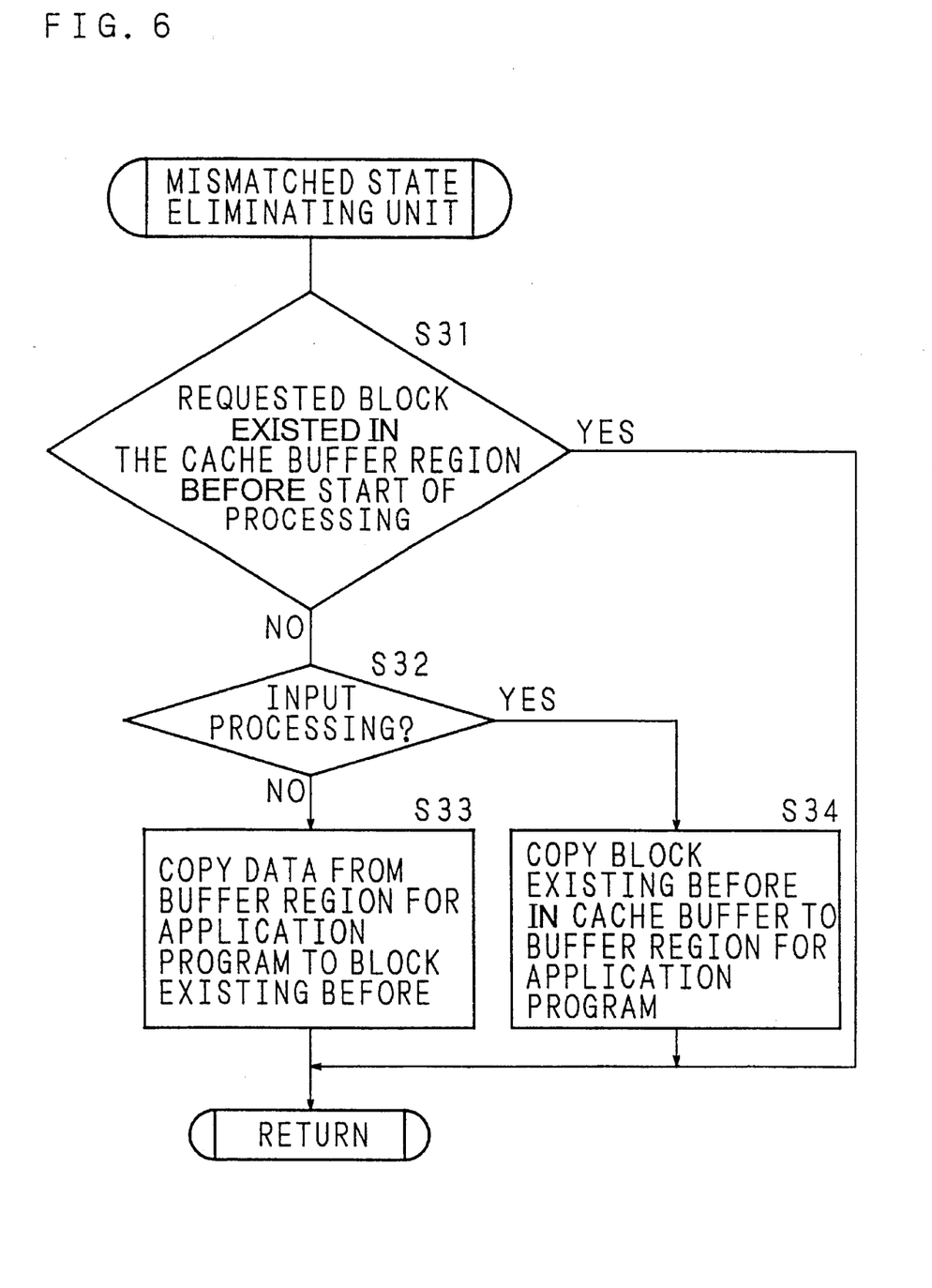
FIG. 6 is a flow chart showing an operating procedure of a mismatching state eliminating unit in managing of a cache buffer of a data processor having a cache buffer of the invention.

Concerning the operation of input and output processing in cases (a) to (e) above mentioned, the operating procedures of the input/output method selecting unit 2, the input/output control unit 4 and mismatched state eliminating unit 12 are sequentially described below while referring to the flow charts in FIG. 4, FIG. 5 and FIG. 6.

In case of input processing for two blocks from block number #0 shown by (a) in FIG. 3, at first the application program 11 gives an input request to the input/output method selecting unit 2 through the signal line 71.

The input/output method selecting unit 2 inquires whether all of the requested blocks are present in the cache buffer region 5 or not, to the input/output control unit 4 through the signal line 74 (step S11). As a result, the control is transferred to the input/output control unit 4 (step S12).

The input/output control unit 4 investigates how many of the requested blocks presently exist in the cache buffer region 5, and responds to the input/output method selecting unit 2 through the signal line 74 (step S21).

In this case, since all of the requested blocks are absent in the cache buffer region 5 (NO at step S13), the input/output method selecting unit 2 reads the condition held by the selection condition holding unit 3 through the signal line 70, and determines whether or not to allocate new blocks to the cache buffer region 5 accordingly (step S14). In this case, since the number of requested blocks (two blocks) is not more than the condition (two blocks) stored in the selection condition holding unit 3 (NO at step S14), the input/output method selecting unit 2 determines to allocate new blocks to the cache buffer region 5, and requests to the input/output control unit 4 to allocate new blocks to the cache buffer region 5 through the signal line 74, thereby moving the control to the input/output control unit (step S15).

The input/output control unit 4 at first allocates new blocks to the cache buffer region 5 (step S22). Next, the input/output control unit 4 requests the input/output unit 9 through the signal line 72 to input data to the buffer region 13 for the application program (steps S23 and S24). As a result, the input/output unit 9 reads out the data of the blocks of the block type device 10 to which input has been requested from the application program 11, and transfers and stores the data into the buffer region 13 for the application program through the routes 88 and 81. The input/output control unit 4 transfers the data to the newly allocated blocks of the cache buffer region 5 from the buffer region 13 for the application program through the routes 81, 84 and 80, and copies and terminates the processing (step S25).

When this processing is over, the input/output method selecting unit 2 requests elimination of the mismatched state to the mismatched state eliminating unit 12 through the signal line 75, and transfers the control to the mismatched state eliminating unit 12 (step S18).

Prior to the above processing, however, since there is no block corresponding to the blocks to be processed in the cache buffer region 5, mismatched state does not occur (YES at step S31). Hence, the mismatched state eliminating unit 12 terminates the processing without any processing.

In case of output processing of two blocks from block number #0 shown by (a) in FIG. 3, at first, the application program 11 gives an output request to the input/output method selecting unit 2 through the signal line 71.

The input/output method selecting unit 2 inquires the input/output control unit 4 whether all of the requested blocks are present in the cache buffer region 5 or not through the signal line 74 (step S11). As a result, the control is transferred to the input/output control unit 4 (step S12).

The input/output control unit 4 investigates how many of the requested blocks presently exist in the cache buffer region 5, and responds to the input/output method selecting unit 2 through the signal line 74 (step S21).

In this case, since all of the the requested blocks are absent in the cache buffer region 5 (NO at step S13), the input/output method selecting unit 2 reads the condition held by the selection condition holding unit 3 through the signal line 70, and determines whether or not to allocate new blocks to the cache buffer region 5 (step S14). In this case, since the requested number of blocks (two blocks) is not larger than the condition (two blocks) stored in the selection condition holding unit 3 (NO at step S14), the input/output method selecting unit 2 determines to allocate new blocks to the cache buffer region 5, and requests the input/output control unit 4 to allocate new blocks to the cache buffer region 5 through the signal line 74, thereby moving the control to the input/output control unit 4 (step S15).

The input/output control unit 4 at first allocates new blocks to the cache buffer region 5 (step S22). Next, the input/output control unit 4 transfers the data to the newly allocated blocks of the cache buffer region 5 from the buffer region 13 for the application program through the routes 81, 84 and 80, and copies it and terminates the processing (steps S23 and S25).

When this processing is over, the input/output method selecting unit 2 requests elimination of mismatched state to the mismatched state eliminating unit 12 through the signal line 75, and transfers the control to the mismatched state eliminating unit 12 (step S18).

Prior to the above processing, however, since there is no cache buffer region 5 corresponding to the block to be processed, mismatched state does not occur (YES at step S31). Hence, the mismatched state eliminating unit 12 terminates the processing without any processing.

In case of input processing of four blocks from block number #0 shown by (b) in FIG. 3, at first the application program 11 gives an input request to the input/output method selecting unit 2 through the signal line 71.

The input/output method selecting unit 2 inquires the input/output control unit 4 whether all of the requested blocks are present in the cache buffer region 5 or not through the signal line 74 (step S11). As a result, the control is transferred to the input/output control unit 4 (step S12).

The input/output control unit 4 investigates how many of the requested blocks presently exist in the cache buffer region 5, and responds to the input/output method selecting unit 2 through the signal line 74 (step S21).

In this case, since all of the requested blocks are absent in the cache buffer region 5 (NO at step S13), the input/output method selecting unit 2 reads the condition held by the selection condition holding unit 3 through the signal line 70, and accordingly determines whether or not to allocate new blocks to the cache buffer region 5 (step S14). In this case, since the requested number of blocks (four blocks) is larger than the condition (two blocks) held in the selection condition holding unit 3 (YES at step S14), the input/output method selecting unit 2 determines not to allocate new blocks to the cache buffer region 5, and requests the input/output unit 9 to input the data of the block requested from the application program 11 directly to the buffer region 13 for the application program (step S16).

As a result, the input/output unit 9 reads out the data in the block of the block type device 10 to which input is requested from the application program 11, and transfers and stores the data into the buffer region 13 for the application program through the routes 88 and 81.

When this processing is over, the input/output method selecting unit 2 requests elimination of the mismatched state to the mismatched state eliminating unit 12 through the signal line 75, and transfers the control to the mismatched state eliminating unit 12 (step S18).

Prior to the above processing, however, since there is no cache buffer region 5 corresponding to the block to be processed, the mismatched state does not occur (YES at step S31). Hence, the mismatched state eliminating unit 12 terminates the processing without any processing.

In case of output processing of four blocks from block number #0 shown by (b) in FIG. 3, at first the application program 11 gives an output request to the input/output method selecting unit 2 through the signal line 71.

The input/output method selecting unit 2 inquires the input/output control unit 4 whether all of the requested blocks are present in the cache buffer region 5 or not through the signal line 74 (step S11), and the processing of the input/output control unit 4 of step S12 is carried out.

The input/output control unit 4 investigates how many of the requested blocks presently exist in the cache buffer region 5, and responds to the input/output method selecting unit 2 through the signal line 74 (step S21).

In this case, since all of the requested blocks are absent in the cache buffer region 5 (NO at step S13), the input/output method selecting unit 2 reads the condition held by the selection condition holding unit 3 through the signal line 70, and accordingly determines whether or not to allocate new blocks to the cache buffer region 5 (step S14). In this case, since the requested number of blocks (four blocks) is larger than the condition (two blocks) held in the selection condition holding unit 3 (YES at step S14), the input/output method selecting unit 2 determines not to allocate new blocks to the cache buffer region 5, and requests the input/output unit 9 to execute output processing (step S16).

As a result, the input/output unit 9 transfers and stores the data of the block of the buffer region 13 for the application program to which output is requested from the application program 11, into the block type device 10 through the routes 81, 88 and 83.

When this processing is over, the input/output method selecting unit 2 requests elimination of the mismatched state to the mismatched state eliminating unit 12 through the signal line 75, and transfers the control to the mismatched state eliminating unit 12 (step S18).

Prior to the above processing, however, since there is no cache buffer region 5 corresponding to the block to be processed, the mismatched state does not occur (YES at step S31). Hence, the mismatched state eliminating unit 12 terminates the processing without any processing.

In case of input processing of four blocks from block number #0 shown by (c) in FIG. 3, at first the application program 11 gives an input request to the input/output method selecting unit 2 through the signal line 71.

The input/output method selecting unit 2 inquires the input/output control unit 4 whether all of the requested blocks are present in the cache buffer region 5 or not through the signal line 74 (step S11). As a result, the control is transferred to the input/output control unit 4 (step S12).

The input/output control unit 4 investigates how many of the requested blocks presently exist in the cache buffer region 5, and responds to the input/output method selecting unit 2 through the signal line 74 (step S21).

In this case, since all of the requested blocks are present in the cache buffer region 5 (YES at step S13), the input/output method selecting unit 2 requests the input/output control unit 4 to copy the data from the cache buffer region 5 into the buffer region 13 for the application program, and transfers the control to the input/output control unit 4 (step S17).

The input/output control unit 4 transfers the data from the cache buffer region 5 to the buffer region 13 for the application program through the routes 80, 84 and 81, and copies it and terminates the input processing.

Prior to the above processing, all of the blocks to be processed are present in the cache buffer region 5, and hence no processing is done in the mismatched state eliminating unit 12.

In case of output processing of four blocks from block number #0 shown by (c) in FIG. 3, at first the application program 11 gives an output request to the input/output method selecting unit 2 through the signal line 71.

The input/output method selecting unit 2 inquires the input/output control unit 4 whether all of the requested blocks are present in the cache buffer region 5 or not through the signal line 74 (step S11). As a result, the control is transferred to the input/output control unit 4 (step S12).

The input/output control unit 4 investigates how many of the requested blocks presently exist in the cache buffer region 5, and responds to the input/output method selecting unit 2 through the signal line 74 (step S21).

In this case, since all of the requested blocks are present in the cache buffer region 5 (YES at step S13), the input/output method selecting unit 2 requests the input/output control unit 4 to copy the data from the cache the buffer region 13 for the application program into the cache buffer region 5, and transfers the control to the input/output control unit 4 (step S17).

The input/output control unit 4 transfers the data from the buffer region 13 for the application program to the cache buffer region 5 through the routes 81, 84 and 80, and copies it and terminates the input processing.

Prior to the above processing, all of the blocks to be processed are present in the cache buffer regions, and hence no processing is done in the mismatched state eliminating unit 12.

In case of input processing of two blocks from block number #7 shown by (d) in FIG. 3, at first the application program 11 gives an input request to the input/output method selecting unit 2 through the signal line 71.

The input/output method selecting unit 2 inquires the input/output control unit 4 whether all of the requested blocks are present in the cache buffer region 5 or not through the signal line 74 (step S11). As a result, the control is transferred to the input/output control unit 4 (step S12).

The input/output control unit 4 investigates how many of the requested blocks presently exist in the cache buffer region 5, and responds to the input/output method selecting unit 2 through the signal line 74 (step S21).

In this case, since only a part of the requested blocks is present in the cache buffer region 5 (NO at step S13), the input/output method selecting unit 2 reads in the condition held by the selection condition holding unit 3 through the signal line 70, and accordingly determines whether or not to allocate new blocks to the cache buffer region 5 (step S14). In this case, since the requested number of blocks (two blocks) is not larger than the condition (two blocks) held in the selection condition holding unit 3 (NO at step S14), the input/output method selecting unit 2 determines to allocate new blocks to the cache buffer region 5, and requests the input/output control unit 4 to allocate new blocks to the cache buffer region 5 through the signal line 74, and transfers the control to the input/output control unit 4 (step S15).

The input/output control unit 4 at first requests the input/output unit 9 to input the data of the block requested by the application program 11 directly into the buffer region 13 for the application program, and the input/output control unit 4 also allocates the block corresponding to block number #8 not allocated yet to the cache buffer region 5 (step S22).

Consequently, the input/output unit 9 reads out the data of the block of the block type device 10 to which input has been requested from the application program 11, and transfers and stores the data into the buffer region 13 for the application program through the routes 88 and 81. The input/output control unit 4 moreover transfers the data from the buffer region 13 for the application program into the newly allocated block of the cache buffer region 5 through the routes 81, 84 and 80, and copies: it and terminates processing (step S25).

Finally, the input/output method selecting unit 2 requests the mismatched state eliminating unit 12 to eliminate the mismatched state of the cache buffer region 5, and transfers the control to the mismatched state eliminating unit 12 (step S18). The mismatched state eliminating unit 12 detects that the block corresponding to the block of the block type device 10 to be processed has been existed in the cache buffer region 5 before start of processing (NO at step S31), and transfers the content of that block (corresponding to block number #7) from the cache buffer region 5 to the buffer region 13 for the application program, and copies it, thereby eliminating the mismatched state to terminate the input processing (steps S32 and S34).

In case of output processing of two blocks from block number #7 shown by (d) in FIG. 3, at first the application program 11 gives an output request to the input/output method selecting unit 2 through the signal line 71.

The input/output method selecting unit 2 inquires the input/output control unit 4 whether all of the requested blocks are present in the cache buffer region 5 or not through the signal line 74 (step S11). As a result, the control is transferred to the input/output control unit 4 (step S12).

The input/output control unit 4 investigates how many of the requested blocks presently exist in the cache buffer region 5, and responds to the input/output method selecting unit 2 through the signal line 74 (step S21).

In this case, since a only part of the requested blocks is present in the cache buffer region 5 (NO at step S13), the input/output method selecting unit 2 reads in the condition held by the selection condition holding unit 3 through the signal line 70, and accordingly determines whether or not to allocate new blocks to the cache buffer region 5 (step S14). In this case, since the requested number of blocks (two blocks) is not larger than the condition (two blocks) held in the selection condition holding unit 3 (NO at step S14), the input/output method selecting unit 2 determines to allocate new blocks to the cache buffer region 5, and requests the input/output control unit 4 to allocate new blocks to the cache buffer region 5 through the signal line 74, and transfers the control to the input/output control unit 4 (step S15).

The input/output control unit 4 allocates the block corresponding to block number #8 not allocated yet newly to the cache buffer region 5 (step S23), and thereafter copies the data to the block newly allocated to the cache buffer region 5 from the buffer region 13 for the application program through the routes 81, 84 and 80.

Finally, the input/output method selecting unit 2 requests the mismatched state eliminating unit 12 to eliminate the mismatched state of the cache buffer region 5, and transfers the control to the mismatched state eliminating unit 12 (step S18). The mismatched state eliminating unit 12 detects that the block corresponding to the block of the block type device 10 to be processed has been existed in the cache buffer region 5 before start of processing (NO at step S31), and transfers the data of that block (corresponding to block number #7) of the buffer region 13 for the application program to the corresponding block of the cache buffer region 5, and eliminates the mismatched state, thereby terminating the output processing (steps S32 and S33).

In case of input processing of four blocks from block number #8 shown by (e) in FIG. 3, at first the application program 11 gives an input request to the input/output method selecting unit 2 through the signal line 71.

The input/output method selecting unit 2 inquires the input/output control unit 4 whether all of the requested blocks are present in the cache buffer region 5 or not through the signal line 74 (step S11). As a result, the control is transferred to the input/output control unit 4 (step S12).

The input/output control unit 4 investigates how many of the requested blocks presently exist in the cache buffer region 5, and responds to the input/output method selecting unit 2 through the signal line 74 (step S21).

In this case, since none of the requested block is present in the cache buffer region 5 (NO at step S13), the input/output method selecting unit 2 reads in the condition held by the selection condition holding unit 3 through the signal line 70, and accordingly determines whether or not to allocate new blocks to the cache buffer region 5 (step S14). In this case, since the requested number of blocks (four blocks) is larger than the condition (two blocks) held in the selection condition holding unit 3 (YES at step S14), the input/output method selecting unit 2 determines not to allocate new blocks to the cache buffer region 5, and requests input processing to the input/output unit 9 (step S16).

Consequently, the input/output unit 9 reads out the data of the block of the block type device 10 to which input has been requested by the application program 11, and transfers and stores it in the buffer region 13 for the application program through the routes 88 and 81.

Finally, the input/output method selecting unit 2 requests the mismatched state eliminating unit 12 to eliminate the mismatched state of the cache buffer region 5. The mismatched state eliminating unit 12 detects that the block corresponding to the block of the block type device 10 to be processed existed in the cache buffer region 5 (NO at step S31), and transfers the content of that block (corresponding to block number #10) into the buffer region 13 for the application program, and copies it, thereby eliminating the mismatched state to terminate the input processing (steps S32 and S34).

In case of output processing of four blocks from block number #8 shown by (e) in FIG. 3, at first the application program 11 gives an output request to the input/output method selecting unit 2 through the signal line 71.

The input/output method selecting unit 2 inquires the input/output control unit 4 whether all of the requested blocks are present in the cache buffer region 5 or not through the signal line 74 (step S11). As a result, the control is transferred to the input/output control unit 4 (step S12).

The input/output control unit 4 investigates how many of the requested blocks presently exist in the cache buffer region 5, and responds to the input/output method selecting unit 2 through the signal line 74 (step S21).

In this case, since none of the requested blocks is present in the cache buffer region 5 (NO at step S13), the input/output method selecting unit 2 reads in the condition held by the selection condition holding unit 3 through the signal line 70, and accordingly determines whether or not to allocate new blocks to the cache buffer region 5 (step S14). In this case, since the requested number of blocks (four blocks) is larger than the condition (two blocks) held in the selection condition holding unit 3 (YES at step S14), the input/output method selecting unit 2 determines not to allocate new blocks to the cache buffer region 5, and requests an input processing to the input/output unit 9 (step S16).

Consequently, the input/output unit 9 reads out the data of the block of the buffer region 13 for the application program to which output has been requested by the application program 11, and transfers and stores the data into the block type device 10 through the routes 81, 88 and 83.

Finally, the input/output method selecting unit 2 requests the mismatched state eliminating unit 12 to eliminate the mismatched state of the cache buffer region 5. The mismatched state eliminating unit 12 detects that the block corresponding to the block of the block type device 10 to be processed existed in the cache buffer region 5 (NO at step S31), and transfers the data of that block (corresponding to block number #10) of the buffer region 13 for the application program into the corresponding block of the cache buffer region 5, thereby eliminating the mismatched state to terminate the output processing (steps S32, S33).

As described above, in the data processor having a cache buffer of the invention, it is judged whether or not to use the cache buffer on the basis of a value of the selection condition set in the selection condition holding unit (means), and therefore the number of exchanges of the cache buffer is suppressed low, and the hit rate is improved, and moreover whenever mismatching of data occurs between the buffer for application program and the cache buffer, the data is copied between the two by the mismatched state eliminating unit (means), so that the mismatched state is canceled.

In addition, by processing of application program, an arbitrary value can be set as a selection condition in the selection condition holding unit (means), so that an appropriate value can be set in the application program.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A data processor connecting a block type memory device capable of inputting and outputting data in block units through inputting/outputting means responding to a request from an application program, and having a cache buffer region for holding data corresponding to blocks existing on said memory device, and having a buffer region for said application program, comprising:

input/output controlling means for judging whether all of the blocks corresponding to the blocks on said memory device to which input or output has been requested by said application program are present or not in said cache buffer region, for allocating new blocks to said cache buffer region, and for inputting or outputting data between said cache buffer region and said buffer region for said application program;

selection condition holding means for holding as a selection condition the number of blocks which can be inputted or outputted in one processing;

input/output method selecting means for inquiring to said input/output controlling means whether all blocks to which input or output processing has been requested by said application program are present in said cache buffer region, and for selecting whether or not to allocate new blocks to said cache buffer region according to the selection condition held by said selection condition holding means when none of the blocks to which input or output processing has been requested by said application program is present in said cache buffer region; and mismatched state eliminating means for eliminating a mismatched state occurring between said buffer region for said application program and said cache buffer region due to the input or output processing of the data by said inputting/outputting means;

wherein said input/output controlling means also stores the data inputted or outputted by said inputting/outputting means in the blocks newly allocated to said cache buffer region when new blocks are allocated to said cache buffer region, and said mismatched state eliminating means copies the content of blocks between the buffer region for said application program and said cache buffer region when said input/output controlling means judges that blocks corresponding to the blocks inputted or outputted by said inputting/outputting means existed in said cache buffer region before start of processing of the data corresponding to the request from said application program.

2. A data processor having a cache buffer as set forth in claim 1, wherein an arbitrary value can be set in said selection condition holding means by processing said application program.

3. A data processor having a cache buffer as set forth in claim 1, wherein said block type memory device comprises a flexible disk unit.

4. A data processor having a cache buffer as set forth in claim 1, wherein said block type memory device comprises a hard disk unit.

5. A data processor having a cache buffer as set forth in claim 1, wherein said block type memory device comprises an optomagnetic disk unit.

* * * * *